Jan. 19, 1960  E. M. DETERS  2,922,055
SUBMERSIBLE MOTOR
Filed March 13, 1959  2 Sheets-Sheet 1

Inventor
Elmer M. Deters
By McCanna, Morsbach & Pillote
Atty's

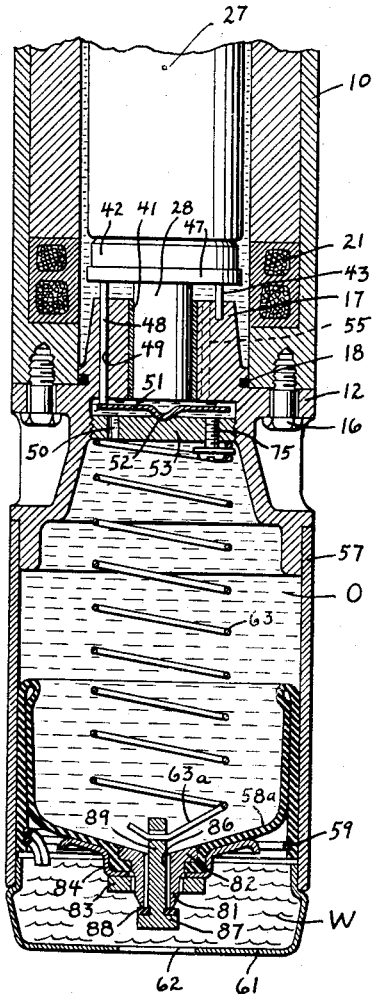
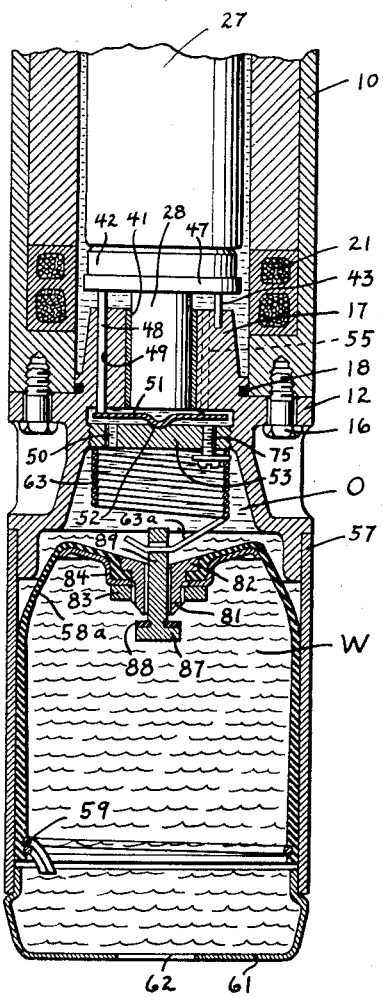

United States Patent Office 2,922,055
Patented Jan. 19, 1960

2,922,055

SUBMERSIBLE MOTOR

Elmer M. Deters, Davenport, Iowa, assignor to Red Jacket Manufacturing Co., Davenport, Iowa, a corporation of Iowa Application March 13, 1959, Serial No. 799,238

10 Claims. (Cl. 310—87)

This invention relates to electric motors and particularly to a motor which is adapted for operation submerged in water.

Submersible electric motors are commonly filled with an insulating and lubricating liquid or oil and have a shaft seal at one end and a diaphragm or movable wall at the other end defining an expansible reservoir for storing a quantity of oil. Pressure is applied to the diaphragm to maintain the oil in the motor under a pressure slightly in access of the fluid pressure outside the motor and cause a small amount of oil to flow out past the shaft seal and thereby prevent the external liquid from entering the motor at that point. The expansible reservoir also permits the oil in the motor to expand and contract, as it is alternately heated and cooled during operation, and prevents the build-up of excess pressure in the motor and the pumping of the external liquid past the shaft seal into and out of the motor.

After a conventional electric motor has been in use for a prolonged period, the oil leaking past the shaft seal will exhaust the oil in the expansible reservoir and the diaphragm or movable wall will reach the end of its movement. Thereafter, when the oil is heated and expands, some oil will flow out past the shaft seal and, as the oil cools and contracts, the pressure in the motor will drop below the fluid pressure outside and permit the external liquid to enter the top of the motor past the shaft seal. When such a motor is operated in water, the water being denser than the oil will flow downwardly in the motor to the motor windings and bearings. Moreover, as the water enters the motor, it is agitated by the rotating armature and parts connected thereto and becomes mixed with the oil to rapidly contaminate all of the oil in the motor. Thus, the water entering the top of the motor soon causes shorting of the stator windings, if the windings are not properly sealed. However, even in those motors employing sealed stators, difficulty is encountered due to the corrosive action of some water on the bearings and other parts of the motor.

When the oil in the expansible portion of the reservoir has been exhausted, an appreciable quantity of oil remains in the reservoir and in the lower portion of the motor casing below the stator windings. It is an important object of this invention to provide a submersible electric motor construction which is operative after the oil in the expansible chamber has been exhausted, to feed that oil which remains in the reservoir and in the lower portion of the motor casing upwardly past the shaft seal to thereby prolong the operation of the motor in the insulating and lubricating medium.

A more particular object of this invention is to provide a submersible electric motor having an expansible reservoir at its lower end which is arranged to seal the reservoir from the surrounding water until the oil in the expansible portion of the reservoir has been exhausted, and which thereafter communicates the reservoir with the surrounding water to permit water to flow into and out of the reservoir as the oil in the motor expands and contracts and to thereby prevent the pumping of water into the motor chamber past the shaft seal.

These, together with various ancillary objects and advantages of this invention will be more readily appreciated as the same becomes better understood by reference to the following detailed description when taken in connection with the accompanying drawings wherein:

Fig. 3 is a fragmentary longitudinal sectional view through a motor having a modified expansible reservoir construction and illustrating the diaphragm position when the expansible reservoir is filled with oil; and Fig. 4 is a fragmentary longitudinal sectional view through the motor of Fig. 3, illustrating the diaphragm position when the oil in the expansible portion of the reservoir is exhausted.

Figure 1:
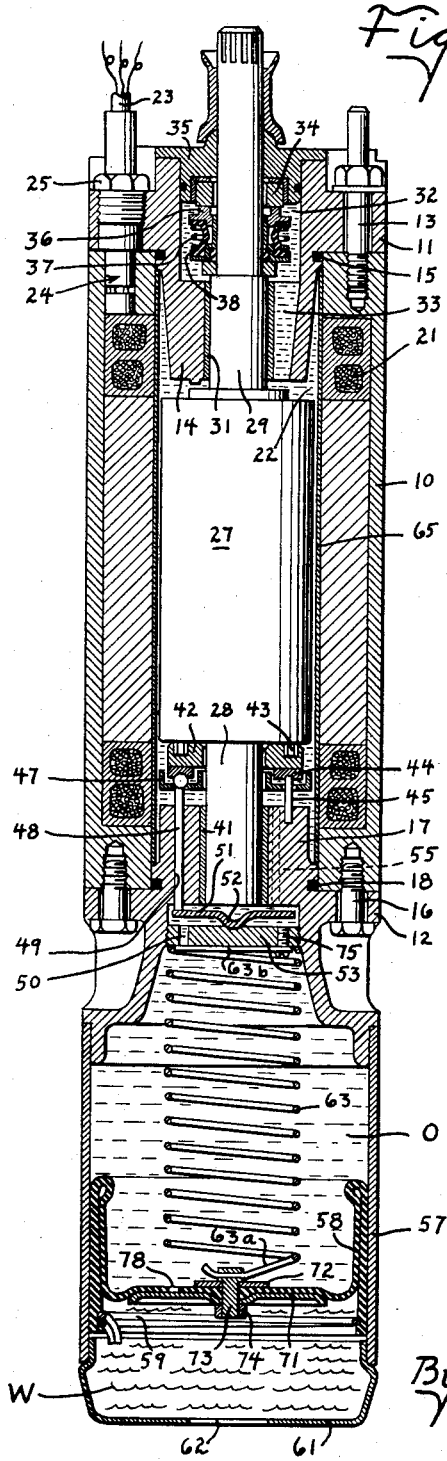
Figure 1 is a longitudinal sectional view through the motor, showing the position of the diaphragm when the expansible reservoir is filled with oil.

The motor of the present invention is designed for operation for a prolonged period immersed in water and includes an outer shell 10 having top and bottom end bells or flanges 11 and 12 at opposite ends thereof. As shown herein, the upper end bell 11 overlies the end of the shell and is secured thereto by studs 13, the upper end bell having a reentrant portion 14 which is sealed to the shell by an O-ring 15. The lower end bell 12 is secured to the shell 10 by cap screws 16 and has a reentrant portion 17 which extends into the shell and is sealed thereto as by O-rings 18.

The field windings 21 extend through slots in the stator laminations and define a central rotor chamber 22 between the end bells. The power input conductors 23 extend through the upper end bell 11 and are connected to the field windings 21 through a molded rubber plug connector 24. The connector is conveniently clamped in position by a gland 25 which seals the opening between the connector and the upper end bell to prevent the entrance of water to the field windings.

The armature 27 is disposed in the rotor chamber 22 and has a lower shaft portion 28 which is supported on the lower end bell and an upper shaft portion 29 which is supported on the upper end bell and extends therethrough for connection to the pump or other apparatus (not shown) to be driven by the motor. More particularly, the upper portion 29 is supported on a radial sleeve bearing 31 carried by the reentrant portion 14 of the upper end bell. The upper end bell has a cavity 32 at the outer end of the bearing 31 and a passage 33 for communicating the cavity with the rotor chamber 22. A sealing means is provided for sealing the shaft 29 to the stator body and as shown herein the sealing means includes a stationary seal member 34 carried by a cap 35 attached to the upper end bell. A rotary seal member 36 is mounted on the shaft for rotation therewith and is yieldably urged against the stationary seal member by a spring 37. The rotary seal member is sealed to the shaft by a bellows-type arrangement 38 and engages the stationary seal member to form a running seal therewith.

The motor is adapted to operate in an upright position and the lower bearing for the armature is accordingly arranged to radially and axially support the same. In the specific form herein illustrated, separate radial and axial thrust bearings are provided. The shaft 28 is radially supported in a sleeve bearing 41 carried by the reentrant portion 17 of the lower end bell. The thrust bearing is conveniently of the self aligning and self adjusting type, of conventional construction, and which includes a rotary element 42 which is connected by pins 43 to the armature for rotation therewith. A plurality of stationary thrust plates 44 are non-rotatably connected by pins 45 to the end bell, and which plates are axially supported by means of a cage 47 and a plurality of annularly spaced rods 48 which extend through openings 49 in the reentrant portion of the end bell and engage a pressure equalizing plate 51. The equalizing plate is tiltably supported on a central spherical seat 52 which engages the cap 53 adjustably into the end bell.

The motor is arranged to be filled with a lubricating and insulating oil designated O and a reservoir is provided at the lower end of the motor for storing a quantity of the oil and for feeding the oil to the rotor chamber as the oil leaks outwardly past the shaft seal at the upper end of the motor. Oil from the reservoir is fed into the rotor chamber 22 through one or more passages 50 in the cap 53 and through the passages 49 around the rods 48, and also through the sleeve bearing 41 around the shaft 28. In addition, one or more passages 55 may be provided in the reentrant portion of the lower end bell to communicate the rotor chamber with the reservoir therebelow. The fluid reservoir preferably includes a rigid portion, such as is formed by the sleeve 57 which is attached to the end bell 12 and extends downwardly therefrom. A movable wall or seal extends across the lower end of the sleeve 57 to form an expansible and contractible oil reservoir and, as shown herein, the movable wall comprises a cup shaped diaphragm 58 which is secured at its periphery to the sleeve 57, as by the expansible clamp ring 59. A protective cap 61 is attached to the lower end of the sleeve and has an enlarged opening or openings 62 therein to provide free communication between the outer side of the diaphragm 58 and the surrounding water W.

The diaphragm 58 is arranged to normally maintain a seal between the reservoir and the surrounding liquid and applies the pressure of the surrounding liquid to the oil in the motor. The fluid pressure acting on the diaphragm is supplemented by a spring 63 which engages the diaphragm and urges the same towards its collapsed position. The spring maintains a pressure on the oil in the reservoir and rotor chamber at a pressure slightly greater than the outside water pressure so that the leakage across the shaft seal will be in a direction outwardly of the motor casing so as to thereby prevent the entrance of water past the shaft seal. The motor is intermittently operated so that the oil therein is alternately heated and cooled and expands and contracts. The expansible reservoir formed by the bellows permits the aforementioned expansion and contraction of the oil and, in addition, stores a relatively large quantity of oil so as to accommodate the leakage past the shaft seal.

Figure 2:
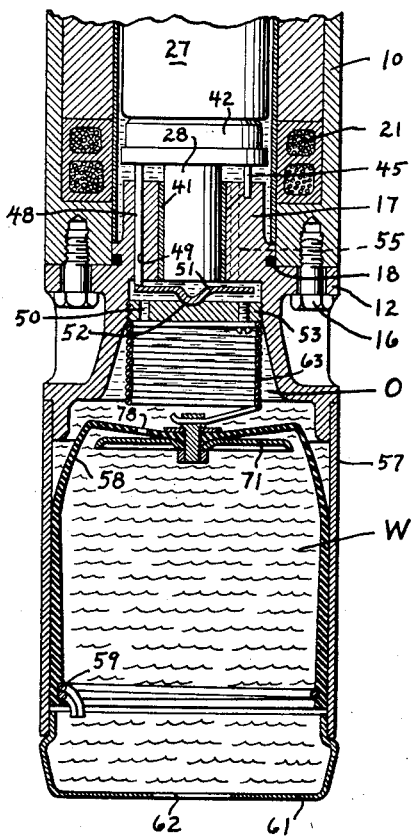
Fig. 2 is a fragmentary longitudinal sectional view through the motor of Figure 1 and showing the position of the diaphragm when the oil in the expansible portion of the reservoir has been exhausted.

After a prolonged period of operation, the movable wall or diaphragm reaches the end of its stroke or movement and the spring is no longer effective to maintain the pressure on the oil in the motor above the surrounding water pressure. As the oil in the motor is thereafter heated and cooled during operation of the motor, the pressure in the motor will periodically drop below the surrounding water pressure so that water may leak into the motor past the shaft seal at the upper end of the motor. This water, being denser than the oil in the motor, will rapidly flow downwardly into the rotor chamber and contact the bearings and windings of the motor. If the windings of the motor are not specially sealed so as to permit operation of the motor in water, the windings will soon short out and render the motor inoperative. However, even in those motors employing sealed stators, some difficulty is encountered due to the corrosive action on the working parts of the motor and to the reduction in lubricating characteristics occasioned by the entrance of water into the motor and bearings. The improvement of the present invention may advantageously be applied to motors having sealed stator windings, as shown in Figs. 1 and 2 as well as to motors in which the windings are not sealed as shown in Figs. 3 and 4. As shown in Figs. 1 and 2, the field windings are sealed by an inner sleeve 65 and may additionally be "potted" in a water impervious plastic.

In accordance with the present invention, provision is made for communicating the reservoir with the water outside the motor, when the liquid in the expansible portion of the reservoir is substantially completely exhausted. The lubricating and insulating oil is selected so as to have a density less than water, and floats on top of the water as it enters the reservoir. This prevents the pressure in the motor from dropping below the surrounding water pressure as the oil cools and contracts and thus prevents the pumping of water into and out of the motor past the shaft seal. Instead, the water flows into and out of the reservoir, as the oil in the motor is alternately heated and cooled. As the oil continues to gradually leak out past the shaft seal at the upper end of the motor, the water will gradually displace the oil which remains in the reservoir, and in the lower portion of the rotor chamber below the field windings. This permits the motor to operate for an additional period as an oil lubricated and insulated motor before the water level reaches the windings. Since the water enters the reservoir below the rotating parts of the motor, the water does not become agitated and mixed with the oil, as occurs when the water enters through the shaft seal at the top of the motor.

Selective communication of the reservoir with the surrounding liquid, after a prolonged period of operation of the motor as a fully sealed oil insulated and lubricated motor, is achieved by the provision of a valve in the reservoir which is arranged to be opened after the oil in the reservoir has been substantially exhausted and the diaphragm approaches the end of its movement. In the embodiment shown in Figs. 1 and 2, a support plate 71 overlies the central portion of the diaphragm at its outer face. The diaphragm is clamped between a washer 72 and the support plate 71, by a fastener 73 and nut 74. The spring 63 herein shown is of the coil type and conveniently attached to the diaphragm 58 by having one end 63a thereof connected to the inner end of the fastener 73. The other end 63b of the spring is attached to the end bell 12 by a fastener 75 which extends into the cap 53. When the rotor chamber 22 and the reservoir are filled with oil, the spring 63 is distended as shown in Fig. 1 and applies pressure to the diaphragm to maintain the oil in the motor under a pressure slightly in excess of the water pressure outside the motor.

A passage 78 is formed in the diaphragm, inwardly of the periphery of the support plate 71 and cooperates with the support plate to form a valve which is closed whenever the fluid pressure inside the reservoir exceeds the water pressure outside. The valve remains closed during substantially the entire movement of the diaphragm from its extended position shown in Figure 1 to its collapsed position and provision is made for terminating the application of spring pressure to the diaphragm when the oil in the reservoir is substantially completely exhausted. While a separate stop may be provided for this purpose, the spring 63 is advantageously arranged so that the convolutions thereof contact each other, as shown in Fig. 2, when the diaphragm reaches a preselected position. Any further loss of oil from the reservoir will reduce the pressure therein slightly below the surrounding water pressure and force the diaphragm away from the support plate, as shown in Fig. 2, to uncover the port 78 and permit water to flow into and out of the reservoir. This applies the fluid pressure outside the motor to the oil in the motor and thus prevents the entrance of water into the motor past the shaft seal. The oil is selected to have a specific gravity or density less than water so that the buoyancy of the oil on the water will tend to cause the oil to flow outwardly past the shaft seal.

The motor construction illustrated in Figs. 3 and 4 is similar to that shown in Figs. 1 and 2 and like numerals are used to designate corresponding parts. The motor of Fig. 3 and 4 differs from that shown in Figs. 1 and 2 primarily in the specific valve construction employed for selectively communicating the fluid reservoir with the water outside the motor, when the oil in the reservoir has been substantially exhausted. In the embodiment of Figs. 3 and 4, a modified form of diaphragm 58a is provided and clamped to the sleeve 57 by the aforementioned expansible ring 59. A bushing 81 having a flange 82 at its inner end, extends through a central opening in the diaphragm and the diaphragm is clamped to the flange by a nut 83 which is threaded on the bushing. A support plate 84 is interposed between the diaphragm and the nut, and overlies a substantial area at the outer side of the diaphragm.

The bushing 81 has a flow passage 86 extending therethrough and a valve member 87 having a gasket 88 overlies the outer end of the bushing to control the flow through the passage. A stem 89 is connected to the valve member and loosely extends through the flow passage 86 to permit liquid to flow past the stem when the valve member is open as shown in Fig. 4. The spring 63 has one end 63a thereof attached to the valve member and the other end secured by the aforementioned fastener 75 to the cap 53 on the lower end bell. Thus, the spring draws the valve member to its closed position shown in Fig. 3 and also yieldably urges the diaphragm toward the rotor chamber to maintain the oil therein under pressure. After a quantity of oil has leaked past the shaft seal, the convolutions of the spring 63 engage each other and terminate the application of spring pressure to the valve and diaphragm. Further contraction of the oil, due to loss past the shaft seal and thermal contraction, will reduce the pressure in the reservoir below the surrounding water pressure whereby the water pressure on the outer side of the diaphragm will move the bushing away from the valve member 87 and open the passage 86. Thereafter, water may flow through the passage 86 into and out of the reservoir, as the liquid therein expands and contracts. As in the preceding embodiment, the oil is selected to have a density less than that of water so as to remain separated therefrom.

From the foregoing it is apparent that the motor will operate for a prolonged initial period as a completely sealed motor until the oil in the reservoir has been substantially exhausted and will thereafter communicate the reservoir with the surrounding water to prevent the entrance of water at the top of the motor around the shaft seal. With this arrangement, that volume of oil which remains in the reservoir after the diaphragm has reached the end of its movement, and the oil in the lower portion of the rotor chamber below the windings, will be exhausted before the water contacts the windings. In this manner, the life of the motor is effectively increased without requiring an increase in the size of the reservoir or the amplitude of movement of the wall or diaphragm.

I claim:

1. An electric motor for operation immersed in water comprising a stator body having a motor field winding therein and defining a rotor chamber, a motor armature in said chamber having an output shaft, bearing means for rotatably supporting the shaft on the stator body, sealing means at one end of said chamber surrounding said shaft for sealing said shaft to said body, means defining an oil reservoir at the other end of said chamber, said last-mentioned means including a movable wall having one side exposed to fluid pressure in the reservoir and the other side exposed to the water pressure outside the motor, a volume of oil having a density less than water filling said rotor chamber and said reservoir, spring means for urging said movable wall toward the rotor chamber to maintain the pressure on the oil above the water pressure outside the motor and prevent the inflow of water past said sealing means, said spring means including means for terminating the application of spring pressure on said wall when the wall reaches a preselected position, passage means communicating said reservoir with the water outside the motor, and valve means normally blocking flow through said passage means and operative to open when the movable wall reaches said preselected position to thereafter permit water from outside the motor to flow into and out of said reservoir as the oil in the motor expands and contracts.

2. An electric motor for operation immersed in water comprising a stator body having a motor field winding therein and defining a rotor chamber, a motor armature in said chamber having an output shaft, bearing means for rotatably supporting the shaft on the stator body, sealing means at one end of said chamber surrounding said shaft for sealing said shaft to said body, means defining an oil reservoir at the other end of said chamber, said last-mentioned means including a movable wall having one side exposed to fluid pressure in the reservoir and the other side exposed to the water pressure outside the motor, a volume of oil having a density less than water filling said rotor chamber and said reservoir, spring means for urging said movable wall toward the rotor chamber to maintain the pressure on the oil above the water pressure outside the motor and prevent the inflow of water past said sealing means, said spring means including means for terminating the application of spring pressure on said wall when the wall reaches a preselected position, passage means in said movable wall communicating said reservoir with the water outside the motor, and valve means normally blocking flow through said passage means and operative to open when the movable wall reaches said preselected position to thereafter permit water from outside the motor to flow through said passage means into and out of said reservoir as the liquid in the motor expands and contracts.

3. An electric motor for operation immersed in water comprising a stator body having a motor field winding therein and defining a rotor chamber, a motor armature in said chamber having an output shaft, bearing means for rotatably supporting the shaft on the stator body, sealing means at one end of said chamber surrounding said shaft for sealing said shaft to said body, means defining an oil reservoir at the other end of said chamber, said last-mentioned means including a movable wall having one side exposed to fluid pressure in the reservoir and the other side exposed to the water pressure outside the motor, a volume of oil having a density less than water filling said rotor chamber and said reservoir, passage means in said movable wall for communicating said reservoir with the water outside the motor, a valve member for controlling flow through said passage means, spring means connected to said member for yieldably urging said member relative to said wall to a position closing said passage means and for urging said wall toward the rotor chamber to maintain the pressure on the oil therein above the surrounding water pressure and prevent the inflow of water past said sealing means, said spring means including means for terminating the application of spring pressure on said valve member when the wall reaches a preselected position whereby said wall is adapted to move away from said valve member and open said passage means to permit water to flow into and out of said reservoir as the liquid in the motor expands and contracts.

4. An electric motor for operation immersed in water comprising a stator body having a motor field winding therein and defining a rotor chamber, a motor armature in said chamber having an output shaft, bearing means rotatably supporting said shaft on the stator body, sealing means at one end of the chamber surrounding said shaft for sealing the shaft to the body, means including a diaphragm defining an oil reservoir at the other end of said chamber, spring means yieldably urging said diaphragm toward said rotor chamber to maintain the pressure in the rotor chamber and reservoir above the pressure of the surrounding water, said spring means including means for terminating the application of spring pressure on said diaphragm when the diaphragm reaches a preselected position, and valve means including a passage in said diaphragm and a valve member movable relative thereto operative to close said passage when the pressure in said reservoir is above the pressure of the surrounding water and to open said passage when the pressure in said reservoir drops below the surrounding water pressure whereby to admit water to said reservoir.

5. An electric motor for operation immersed in water comprising a stator body having a motor field winding therein and defining a rotor chamber, a motor armature in said chamber having an output shaft, bearing means rotatably supporting said shaft on the stator body, sealing means at one end of said chamber surrounding said shaft for sealing said shaft to said body, means including a diaphragm defining an oil reservoir at the other end of said chamber, valve means including a passage extending through said diaphragm and a valve member mounted on the diaphragm for limited movement relative thereto between a position closing said passage and an open position, spring means for yieldably urging said diaphragm toward said rotor chamber to maintain the pressure in the rotor chamber above the surrounding water pressure, said spring means including means for terminating the application of spring pressure on the diaphragm when the diaphragm reaches a preselected position and for also limiting further movement of said valve member whereby to permit said diaphragm to move relative to the valve member and open said passage when the pressure in the reservoir drops below the pressure on the surrounding water.

6. An electric motor for operation immersed in water comprising a stator body having a motor field winding therein and defining a rotor chamber, a motor armature in said chamber having an output shaft, bearing means rotatably supporting said shaft on the stator body, sealing means at one end of the chamber surrounding said shaft for sealing the shaft to the body, means including a diaphragm defining an oil reservoir at the other end of said chamber, a support plate overlying the central portion of the diaphragm at the outer side thereof, said diaphragm having an opening therein located inwardly of the periphery of said plate, spring means connected to said plate for yieldably urging the plate and diaphragm toward said rotor chamber to maintain the pressure in the rotor chamber and reservoir above the pressure on the surrounding water and to thereby press the diaphragm against the plate to close said opening, and means for limiting movement of said plate beyond a preselected position to terminate the application of spring pressure to said diaphragm and permit said diaphragm to move away from said plate and uncover said opening when the pressure in the reservoir drops below the surrounding water pressure.

7. The combination of claim 6 wherein said spring means comprises a coiled tension spring, the convolutions of said spring being arranged to engage each other when said plate reaches said preselected position whereby to limit further movement of said plate.

8. An electric motor for operation immersed in water comprising a stator body having a motor field winding therein and defining a rotor chamber, a motor armature in said chamber having an output shaft, bearing means rotatably supporting said shaft on the stator body, sealing means at one end of the chamber surrounding said shaft for sealing the shaft to the body, means including a diaphragm defining an oil reservoir at the other end of said chamber, means mounted on said diaphragm defining a passage extending therethrough and a valve seat at the outer end of said passage, a valve member engageable with said seat and having a stem slidably supported in said passage, and spring means connected to said stem for yieldably urging said valve member to a position closing said passage and for yieldably urging said diaphragm toward said rotor chamber to maintain the pressure on the oil in said reservoir above the surrounding water pressure, said spring means including means for limiting movement of said valve member beyond a preselected position to terminate the application of spring pressure to said diaphragm whereby to permit said diaphragm and valve seat to move away from the valve member and open said passage when the pressure in the reservoir drops below the surrounding water pressure.

9. The combination of claim 8 wherein said spring means includes a coil spring terminably attached to said stem and to said body, the convolutions of said coil spring being arranged to engage when said valve member reaches said preselected position to emit further movement thereof.

10. An electric motor for operation immersed in water comprising a stator body having a motor field winding therein and defining a rotor chamber, a motor armature in said chamber having an output shaft, bearing means rotatably supporting said shaft on the stator body, sealing means at one end of the chamber surrounding said shaft for sealing the shaft to the body, means including a diaphragm defining an oil reservoir at the other end of said chamber, a rigid bushing extending through said diaphragm defining a passage and a seat at the outer end of said bushing, a valve member overlying the outer end of said bushing and having a stem slidably extending through said passage, and a coil spring connected to said stem and to said body for urging said diaphragm inwardly of said reservoir and for terminating the application of spring pressure on said valve member when convolutions of the spring engage each other.

No references cited.